United States Patent [19]
Bontekoe

[11] Patent Number: 5,442,636
[45] Date of Patent: Aug. 15, 1995

[54] CIRCUIT AND METHOD FOR ALIGNMENT OF DIGITAL INFORMATION PACKETS

[75] Inventor: Hendricus M. H. Bontekoe, Huizen, Netherlands

[73] Assignee: AT&T Corp., Murray Hill, N.J.

[21] Appl. No.: 166,473

[22] Filed: Dec. 14, 1993

[51] Int. Cl.$^6$ .............................................. H04J 3/06
[52] U.S. Cl. .................................................. 370/108
[58] Field of Search ................. 370/105, 105.1, 100.1, 370/106, 84, 108, 112, 94.1; 375/116, 108, 111, 112, 118, 114, 117

[56] References Cited

U.S. PATENT DOCUMENTS

| | | | |
|---|---|---|---|
| 4,543,652 | 9/1985 | Amada et al. | 370/105.1 |
| 4,698,806 | 10/1987 | Geraves et al. | 370/105.1 |
| 4,788,681 | 11/1988 | Thomas et al. | 370/105.1 |
| 4,823,365 | 4/1989 | Loginov | 370/108 |
| 4,993,026 | 2/1991 | Yamashita | 370/100.1 |
| 5,014,272 | 5/1991 | Yoshida | 370/105.1 |
| 5,018,140 | 5/1991 | Lee et al. | 370/105.1 |
| 5,271,006 | 12/1993 | Ashi et al. | 370/105.1 |

OTHER PUBLICATIONS

"General Aspects of Digital Transmission Systems; Terminal Equipment," CCITT Blue Book, vol. III, Nov. 1988, pp. 107-174.

*Primary Examiner*—Douglas W. Olms
*Assistant Examiner*—Ajit Patel

[57] ABSTRACT

A frame aligner circuit for aligning a plurality of information packet signals received within a maximum starting time variation interval consists of a plurality of frame detectors, stretch circuits and variable delay circuits which are controlled by a synchronization signal generator and a delay control circuit. The delay control circuit in one embodiment of the present invention delays each information packet signal for a duration of time defined by the start of the information packet signal and an interval of time following the start of a last received information packet signals. In this manner, each information packet signal is delayed a corresponding period of time to align the plurality of information packet signals with respect to one another.

17 Claims, 8 Drawing Sheets

CIRCUIT AND METHOD FOR ALIGNMENT OF DIGITAL INFORMATION PACKETS

FIELD OF INVENTION

The present invention relates to digital signal multiplexers in general and in particular to multiplexers which operate on frame aligned digital information packets.

BACKGROUND OF THE INVENTION

In telecommunication and other information transmission systems, multiplexing of digital information is utilized to transmit multiple information signals simultaneously over a common transmission channel. In such systems, digital information from different sources is interleaved synchronously multiplexed into a single signal for transmission over a channel to a destination receiver. The receiver then demultiplexes the received signal into the original separate information signals.

Systems which organize digital information into discrete sequences or packets may require the information packets to be aligned before multiplexing and transmission. One such system is the synchronous digital hierarchy (SDH) which is used for the transmission of voice, video and other digital information. A general description of SDH is provided in CCITT Recommendation G.707-709 pp. 107-174 (1989). Within an SDH system, one method of transmitting information is to transmit the information in synchronous transport module level 1 frames (STM-1 frames). Each STM-1 frame comprises an 81 byte header containing a pointer and overhead information and a payload of 2349 bytes containing message information. STM-1 frames are transmitted at a rate of 155.52 Mbits/s. Four STM-1 frames may be combined to form a single synchronous transfer module level 4 (STM-4) frame. In this manner, four STM-1 frames may be transmitted simultaneously over a common channel.

In order to form a STM-4 frame, the 2349 byte payloads of four STM-1 frames are aligned and then multiplexed into the payload of a STM-4 frame. In the same manner, the payloads of sixteen STM-1 frames or four STM-4 frames or their equivalents may be aligned and multiplexed into the payload of a synchronous transfer module level 16 frame (STM-16 frame). A general description of synchronous transfer modules is found in CCITT Recommendation G.708, §§ 2.2.7-4.2:3 p. 113-117 (1989). However, the generation of STM-1 frames does not occur simultaneously and therefore, some manner of frame alignment is required in order to transform four STM-1 frames into an STM-4 frame or sixteen STM-1 frames into a STM-16 frame.

In addition, there are various methods for maintaining the proper timing of the operations of interleaving the information signals in multiplexers which must be considered in any implementation of a frame alignment circuit. One prior art method utilizes a system wide synchronous timing clock such that each of the reference signals are supplied to the multiplexer circuit in a synchronous manner. A disadvantage of this technique required complex hardware and overhead communications to maintain synchronization of the different information sources. Further, this method is not applicable to information systems in which the information sources are free running and can not be readily synchronized, such as in an SDH system.

Another method for providing a timing reference to a multiplexer utilizes one specific information stream from a particular information source to provide a timing reference for the synchronous multiplexing. However, a disadvantage of this technique is the inability for the multiplexer to operate in a normal manner when the information stream used to generate the timing signal is lost or interrupted.

Therefore, it would be advantageous to have a circuit to align multiple information frames or information packets which does not utilize a system synchronous timing clock or generate a timing clock signal based on the information produced by a particular information source.

SUMMARY OF THE INVENTION

An object of the present invention is to provide a circuit which aligns information packets or frames from a fixed number of free-running information sources.

Another object of the present invention is to provide an information frame alignment circuit which does not require the information to be provided to the circuit in a synchronous manner or which does not rely on a reference timing signal based on the information stream generated from a particular information source.

Yet another object of the present invention is to provide a lost cost frame alignment circuit requiring a minimal amount of overhead operations and which is suitable for use on information frames with data rates on the order of 155.52 Mbits/sec.

The present invention provides a frame alignment circuit which aligns digital information packets received from a fixed number of free-running sources wherein each of the information packets has a common data rate. The frame alignment circuit utilizes a stretch circuit and a variable delay circuit for each one of the information sources. A single delay control circuit receives signals generated by each of the stretch circuit and controls each of the variable delay circuits so as to delay each information packet for a specific period of time to produce aligned information packets.

An advantage of the present invention is the capability to align a plurality of information packets automatically from a like plurality of information sources within a maximum starting time variation interval. Another advantage of the present invention is that it may be constructed of inexpensive off the shelf components which are readily available.

DETAILED DESCRIPTION

Figure 1:
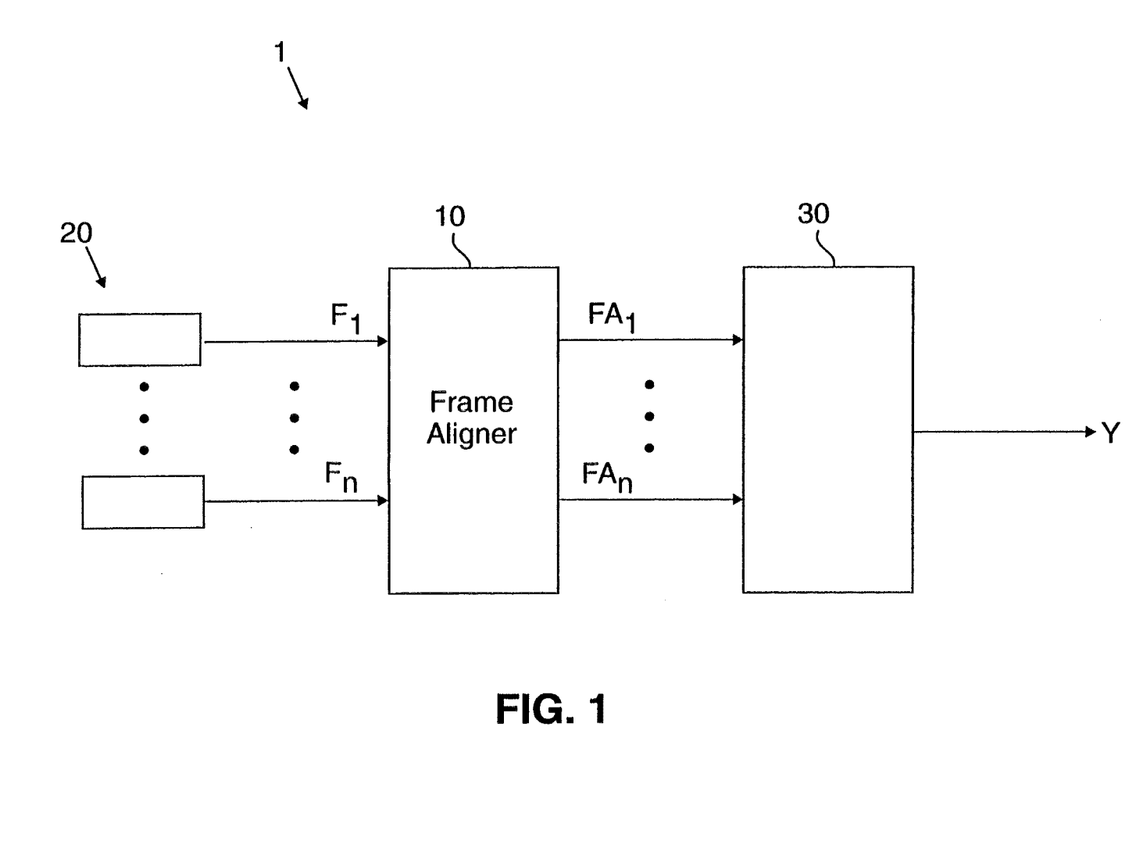
FIG. 1 is schematic illustration of a multiplexer system employing a frame aligner according to the present invention.

A system 1 utilizing a frame aligner 10 according to the present invention is shown in FIG. 1. A fixed number n of free-running information sources 20 provide corresponding information packet signals $F_1$-$F_n$. Each one of the information packet signals $F_1$-$F_n$ contains digital information frames or packets. The frame aligner 10 delays each of the received information packets in the signals $F_1$-$F_n$ for a particular time interval so as to align each one of the information packet signals $F_1$-$F_n$ and generate aligned information packet signals $FA_1$-$FA_n$. The aligned frame signals $FA_1$-$FA_n$ are provided to a multiplexer 30 which multiplexes them into a single signal Y. The information packet signals $F_1$-$F_n$ generated by the information sources 20 have substantially the same data rate, but are not necessarily synchronous with respect to one another. The information frames may be STM-1 frames utilized in an SDH system.

Figure 2:
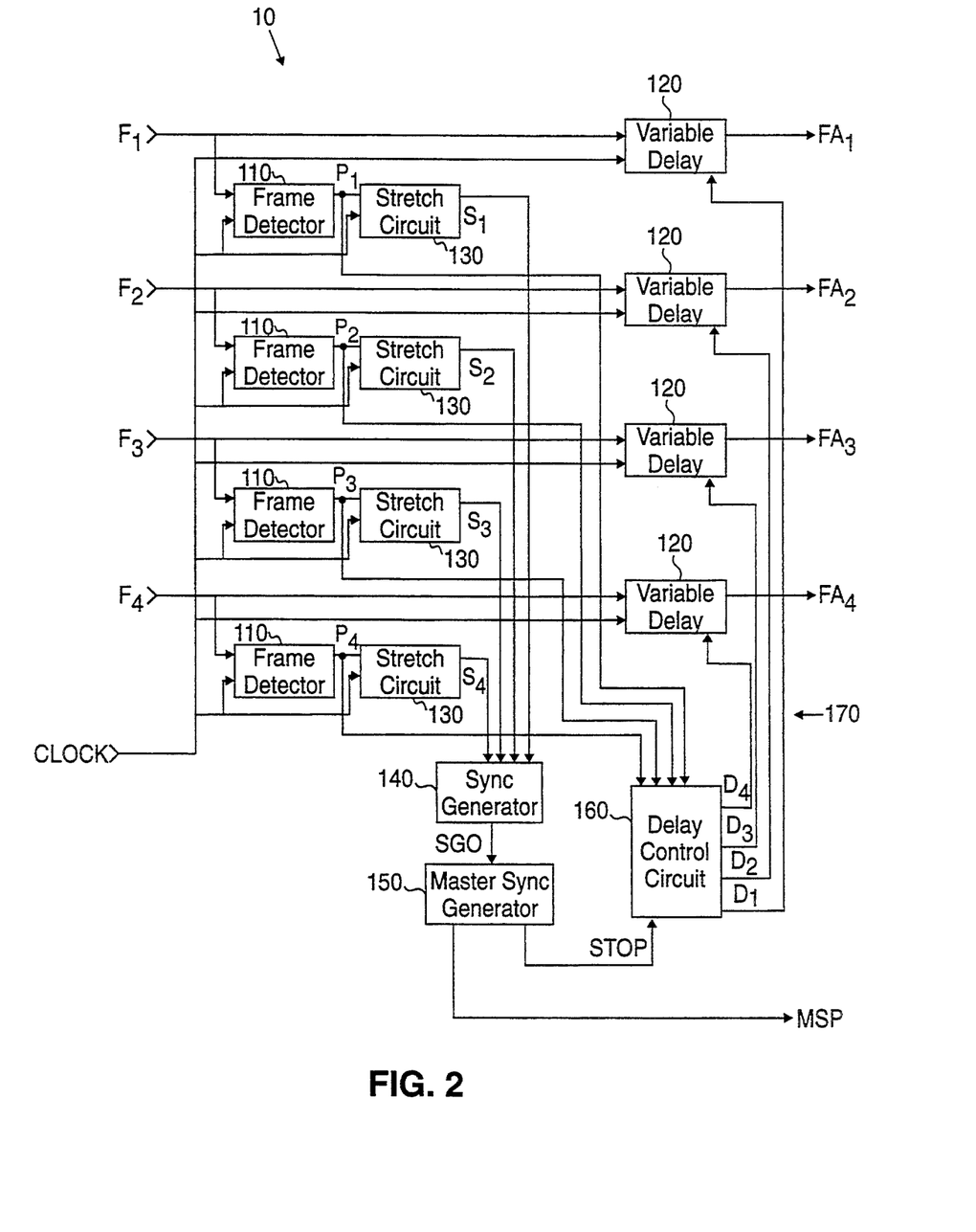
FIG. 2 is a more detailed schematic illustration of the frame aligner of FIG. 1.

One suitable frame aligner 10 according to the present invention is shown in FIG. 2. The frame aligner 10 of FIG. 2 is illustrated to align information packet signals $F_1$-$F_4$ received from four information sources, such as information sources 20 of FIG. 1. The frame aligner 10 aligns information packets contained in the information packet signals $F_1$-$F_4$ that are received within a maximum starting time variation interval. In other words, the frame aligner 10 will align the information packets whose starting points are received within a time period equivalent to the maximum starting time variation interval following the start of a first received information packet. In addition, the depiction in FIG. 2 of the frame aligner 10 processing four information packet signals $F_1$-$F_4$ is for clarity and ease of illustration purposes only. The present invention may also be used to align a greater or lessor number of information packet signals.

Referring to FIG. 2, each one of information packet signals $F_1$-$F_4$ are applied to a corresponding frame detector 110 and variable delay circuit 120. The frame detector 110 senses the receipt of a start word which indicates in the start of an information packet and generates a corresponding one of start signals $P_1$-$P_4$ which is applied to a corresponding stretch circuit 130. Upon receipt of the start signals $P_1$-$P_4$, each one of the stretch circuits 130 generates a corresponding one of stretch signals $S_1$-$S_4$ which is provided to a synchronization signal generator 140.

The synchronization signal generator 140 generates an output signal SG0 which is applied to a master synchronization signal generator 150. The master synchronization signal generator 150 generates two signals, a master synchronization signal MSP and a stop pulse STOP. The stop pulse STOP is provided to each one of delay control circuit 160. The delay control circuit 160 also receives the start signal from the corresponding frame detector 110. The delay control circuit 160 is connected to each one of the variable delay circuits 120 by control lines 170.

Each one of the variable delay circuits 120 delays the corresponding one of information packet signals $F_1$-$F_4$ by a specific time interval to produce the aligned information packet signals $FA_1$-$FA_4$. The duration of the corresponding delay for each of the variable delay circuits 120 is determined in the delay control circuit 160 and transmitted to the variable delay circuits 120 in delay signals $D_1$-$D_4$ on the control lines 170.

In addition, a timing reference clock signal CLOCK is provided to the frame detectors 110, the variable delay circuits 120 and the stretch circuits 130. The frequency of the clock signal CLOCK is substantially identical to the data rate of the information packet signals $F_1$-$F_4$.

The frame aligner 10 of FIG. 2 will align information packets received in signals $F_1$-$F_4$. The frame aligner 10 will align information packets of any length which are received within a specific maximum starting time variation interval. In operation, the detection of the start words in the information packet signals $F_1$-$F_4$ by the frame detectors 110 causes the generation of the start signals $P_1$-$P_4$. The stretch circuits 130 generate stretch signals $S_1$-$S_4$ in response to receipt of the start signals $P_1$-$P_4$. Also, the start signals $P_1$-$P_4$ cause the delay control circuit 160 to direct the variable delay circuits 120 to initiate a delay sequence.

The stretch signals $S_1$-$S_4$, which are substantially equivalent in duration to the maximum starting time variation interval, cause the synchronization pulse generator 140 to generate the signal SG0. The signal SG0 ends at substantially the same time as a completion of the last received one of stretch signals $S_1$-$S_4$. Upon the completion of the signal SG0, the master synchronization signal generator 150 generates a stop pulse STOP. The stop pulse STOP causes the delay control circuit 160 to direct the variable delay circuits 120 to set the delay interval as the difference in time between initiation of the delay sequence until the receipt of the stop pulse STOP. Each one of the delayed information packet signals $FA_1$-$FA_4$ will have a specific associated delay relative to the corresponding information packet signals $F_1$-$F_4$ such that the signals $FA_1$-$FA_4$ will be aligned with respect to one another.

Although stretch signals of longer duration may be utilized, a minimum delay of the information packets in the signals $F_1$-$F_4$ is achieved when the stretch signal duration is substantially equivalent to the maximum starting time variation interval.

Figure 3:
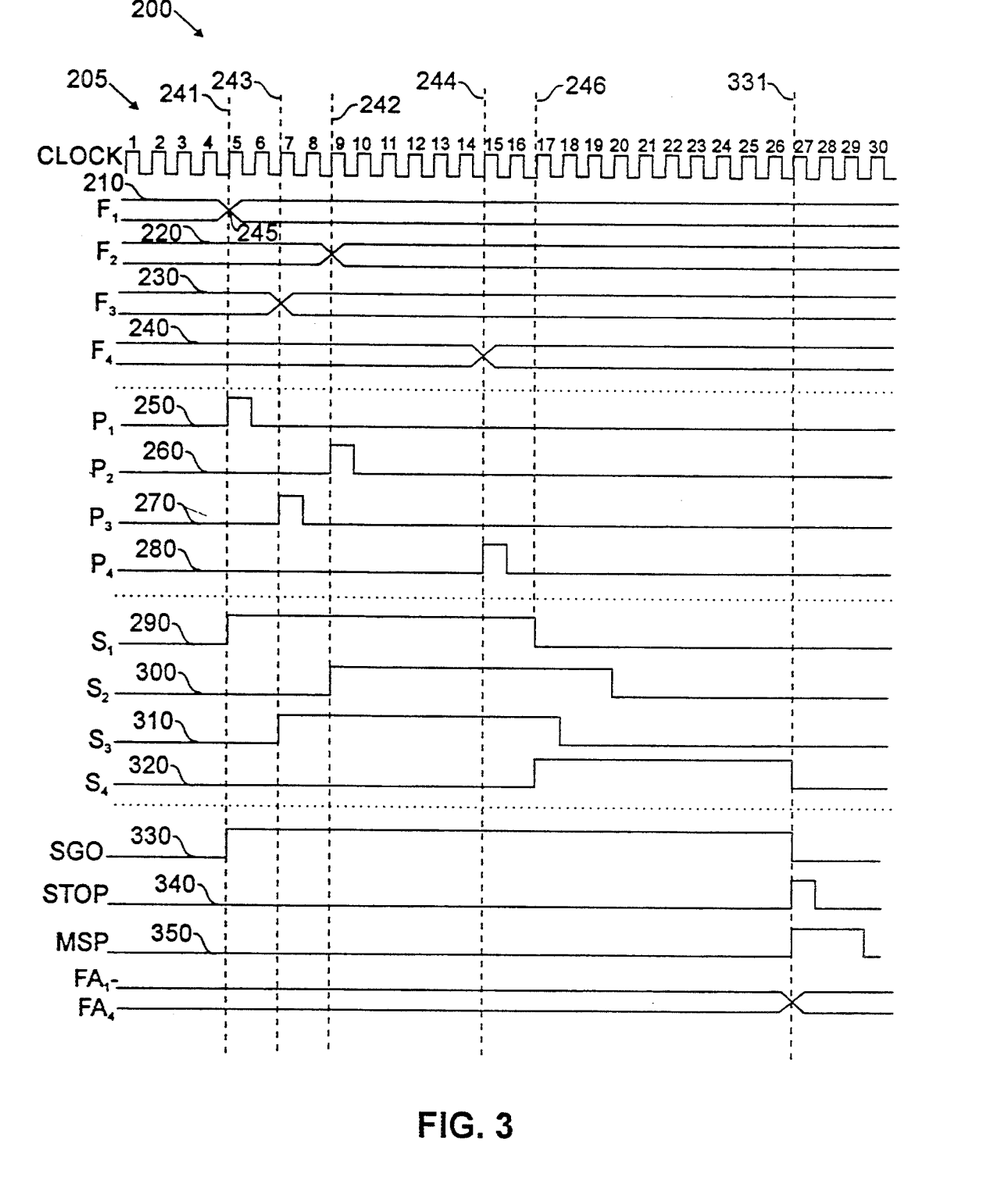
FIG. 3 is a signal timing diagram corresponding to the frame aligner of FIG. 2.

FIG. 3 depicts a timing signal diagram 200 representing the operation of the frame aligner 10 of FIG. 2 having a maximum starting time variation interval of 12 clock cycles of the clock signal CLOCK. The selection of 12 clock cycles for the alignment maximum starting time variation interval in FIG. 3 is for illustration purposes only. The frame aligner 10 may be used to align signals possessing a greater or lesser starting time variation.

In FIG. 3, the clock signal CLOCK of FIG. 2 is shown as waveform 205 with each cycle numbered 1–30, respectively. The digital signals represented in FIG. 3 and in a timing diagram 800 in FIG. 8, such as the clock signal waveform 205 in FIG. 3, are depicted as perfect square waves for clarity and ease of illustration purposes only. It should be readily understood by those skilled in the art that such signals are not perfect square waves and possess associated rise and fall times.

The information packet signals $F_1$-$F_4$ received by the frame aligner 10 are shown as signals 210–240 in FIG. 3. The information packet signals $F_1$-$F_4$ 210–240 contain sequences of logic ones and zeros which are represented by parallel line waveforms 210–240. The actual data sequences in the information packet signals $F_1$-$F_4$ is not important to the operation of the frame aligner 10 which operates to delay each signal by a particular time interval so as to produce the frame aligned information packet signals $FA_1$–$FA_4$ of FIG. 2.

Further, the start of the information packet within the information packet signals follow the receipt of the associated start word. The start of each information packet in FIG. 3 is represented by a cross, such as the cross 245. In FIG. 3, the start of the information packets in the information packet signals $F_1$–$F_4$ 210–240 occur at times 241, 242, 243 and 244, respectively.

When the information packets in the information packet signals $F_1$–$F_4$ 210–240 are received by the frame aligner 10, the corresponding frame detectors 110 in FIG. 2 will detect the start words and substantially simultaneously generate corresponding start signals $P_1$–$P_4$, as shown by start signal waveforms 250–280 in FIG. 3. The start signal waveforms 250–280 have rising edges of the signal at the times 241, 242, 243 and 244 for indicating the receipt of the corresponding information packets.

The start signals 250–280 cause the delay control circuit 160 to control the corresponding variable delay circuits 120 to initiate a delay sequence. The delay control circuits 120 then sequentially store each of the received information packets until further instructions are received from the delay control circuit 160. Also, the start signals 250–280 are received by the corresponding stretch circuits 130. In response to the receipt of the start signals 250–280, the stretch circuits 130 generate the corresponding stretch signals $S_1$–$S_4$ as shown by waveforms 290–320.

The generated stretch signals $S_1$–$S_4$ 290–320 are signals having a duration equivalent to the maximum starting time variation interval for the particular frame aligner 10. As stated above, the maximum starting time variation interval for the frame aligner 10 represented by the timing diagram 200 is 12 clock cycles of the clock signal clock 205. Thus, each of stretch signal waveforms 290–320 have a duration of 12 cycles. For example, the stretch signal waveform 290 which corresponds to the stretch signal $S_1$ originates at time 241, or clock cycle number 5, and ends 12 clock cycles later at a time 246, or clock cycle number 17. Likewise, the stretch pulse waveforms 300, 310 and 320 originate at clock cycle numbers 9, 7 and 15, respectively, and end 12 clock cycles later at clock cycle numbers 21, 19 and 27, respectively.

The stretch signals $S_1$–$S_4$ 290–320 are provided to the synchronous signal generator 140 which generates the signal SG0 based on a boolean logic OR of the received stretch signals $S_1$–$S_4$ 290–320. The signal SG0 is shown in FIG. 3 as waveform 330, which is a signal originating at time 241, the start time of the first received stretch signal $S_1$ 290, and ending at a falling edge of the latest received stretch signal $S_4$ 320, which occurs at a time 331. Thus, a suitable circuit for the synchronous signal generator 140 may be a four-input OR-gate or its equivalents.

The signal SG0 330 is applied to the master synchronous signal generator 150 which generates the stop pulse STOP, shown as a waveform 340 in FIG. 3, and a signal MSP, shown as a waveform 350 in FIG. 3. The stop pulse STOP and the signal MSP originate at the falling edge of the signal SG0 T time 331.

Upon receipt of the stop pulse STOP at time 331, the delay control circuit 160 instructs the variable delay circuits 120 to initiate generation of the frame aligned information packet signals $FA_1$–$FA_4$ 360 based on the received information packet signals $F_1$–$F_4$ 210–240. Correspondingly, each variable delay control circuit 160 will delay each bit of the corresponding received information packet signals $F_1$–$F_4$ 210-240 by a time interval corresponding to the time difference between the initial receipt of the information packet signals $F_1$–$F_4$ 120–240 and the time 331. Thus, the information packet signal $F_1$ 210 will be delayed 22 clock cycles, i.e., the difference from the start of receipt of the information packet at time 241 to the time 331, i.e., clock cycle number 5 to clock cycle number 27. Likewise, information packet signals $F_2$–$F_4$ 220, 230 and 240 will be delayed 18, 20 and 12 clock cycles, i.e., the time difference between times 242 and 331, times 243 and 331 and times 244 and 331, respectively.

Figure 4:
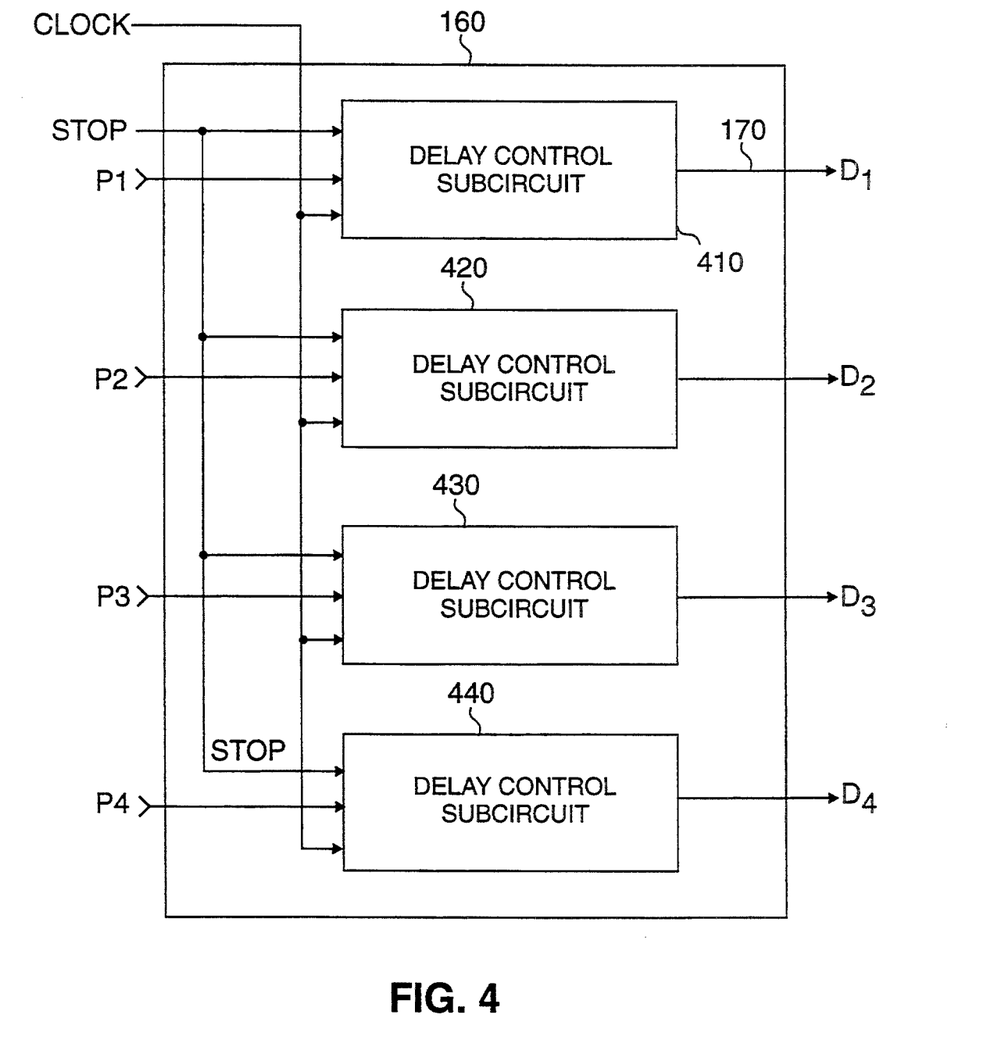
FIG. 4 is a more detailed schematic illustration of a delay control circuit of FIG. 2.

One suitable delay control circuit 160 is shown in FIG. 4. Within the delay control circuit 160 of FIG. 4 are four identical delay control subcircuits 410–440, each subcircuit corresponding to one of the four information packet signals $F_1$–$F_4$ of FIG. 2. Each one of the delay control subcircuits 410–440 receives a corresponding one of start signals $P_1$–$P_4$ and the stop pulse STOP. Further, each one of the delay control subcircuits 410–440 generates the corresponding delay signal of the delay signals $D_1$–$D_4$ based on the time interval between the receipt of the corresponding start signal $P_1$–$P_4$ and the stop pulse STOP. A delay control circuit for alignment of a plurality of information packet signals may be implemented using a corresponding plurality of delay control subcircuits, such as the delay control subcircuits 410–440 in FIG. 4.

Figure 5:
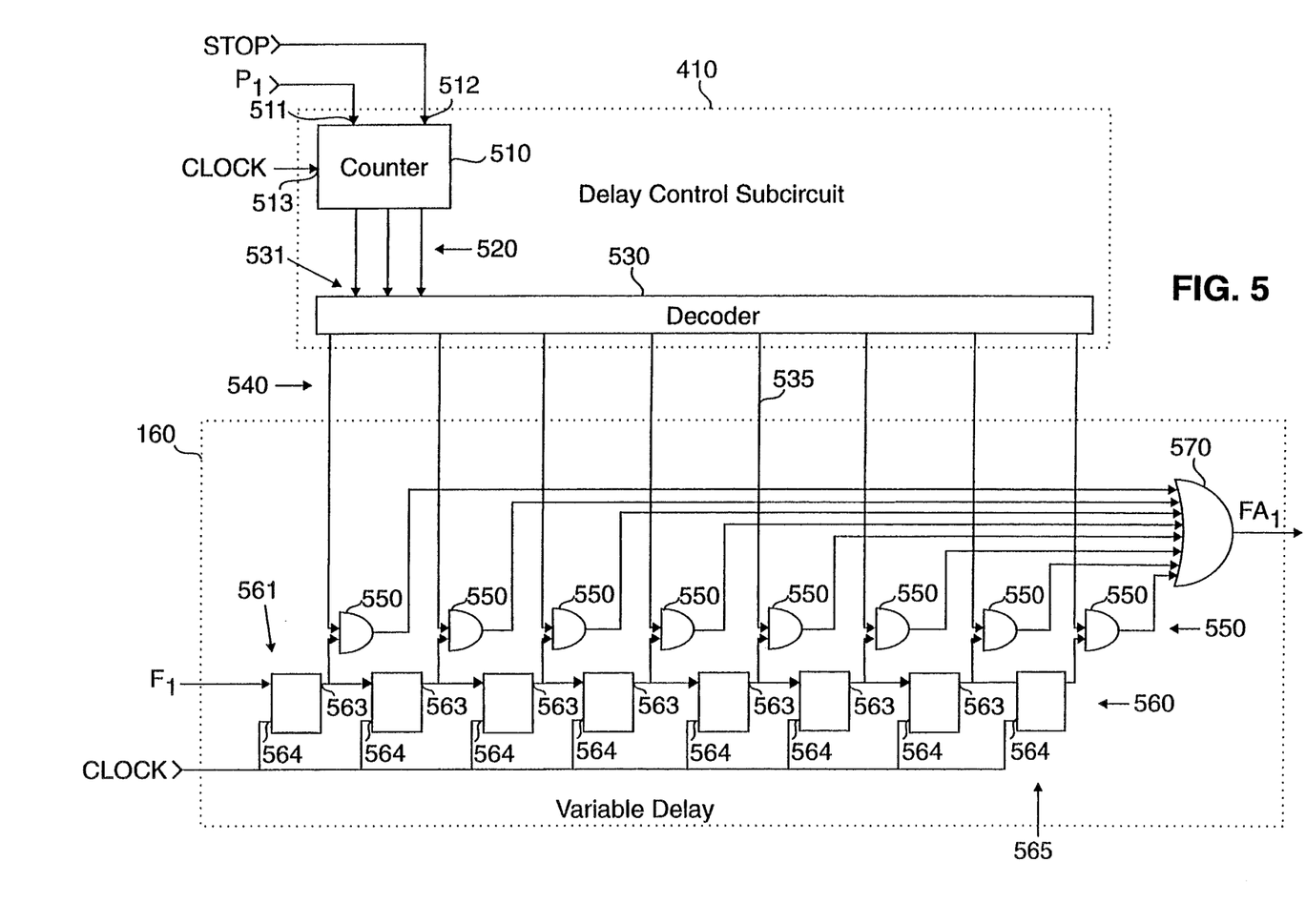
FIG. 5 is a more detailed schematic illustration of an arrangement of a delay control subcircuit of FIG. 4 and a variable delay circuit of FIG. 2.

One suitable delay control subcircuit 410 and corresponding variable delay circuit 120 arrangement for operation on the information packet signal $F_1$ is shown in FIG. 5. The delay control subcircuit 410 contains a Johnson or binary counter 510 which receives the start signal $P_1$ at its reset/start input 511 and the stop pulse STOP at its stop input 512. The counter 510 generates a binary output count or number at lines 520. Also, a clock input 513 of the counter 510 receives the clock signal CLOCK.

The output count lines 520 are connected to inputs 531 of a decoder 530. The decoder 530 transmits the delay signal $D_1$ on output lines 540 which are connected to the delay control circuit 140. The decoder 530 operates by asserting a particular decoder output line of output lines 540 which corresponds to the binary number provided to the decoder inputs 531. The decoder 530 is shown in FIG. 5 with three inputs 531 and eight outputs lines 540 for clarity and ease of illustration purposes only. A greater or lesser number of inputs and outputs may be used in a circuit according to the present invention.

The number of decoder output lines 540 should be selected so as to be capable of producing a delay of at least twice the maximum starting time variation interval. Thus, the frame aligner 10 as characterized by the timing signal diagram 200 in FIG. 3, has the maximum starting time variation interval of 12 clock cycles of the clock signal and would require a sufficient number of decoder output lines 540 to produce a delay of 24 clock cycles. Thus, if each decoder output line could produce a delay of one clock cycle, a 5 to 32 decoder may be utilized.

The variable delay circuit 160 of FIG. 5 consists of a series of stages of logic AND-gates 550 and D-Type flip-flops 560. The corresponding information packet signal $F_1$ is applied to an input 562 of a first flip-flop 561 of the flip-flops 560. The input 562 of each subsequent flip-flop 560 is connected to an output 563 of the previous stage flip-flop 560. Also, the clock signal CLOCK is supplied to clock inputs 564 of the flip-flops 560 for a timing reference.

Each one of the AND-gates 550 is connected to a corresponding one of decoder output lines 540 and a corresponding output 563 of flip-flops 560. Also, each one of the AND-gates 550 generates a signal which is applied to a multiple-input logic OR-gate 570 which generates the aligned information packet signal $FA_1$. The output 563 of the last delay stage flip-flop 565 is connected to a corresponding AND-gate 550 only.

In operation, the counter 510 generates a binary count signal on the output lines 520 corresponding to the number of clock cycles between the receipt of the start pulse $P_1$ and the stop pulse STOP. The decoder 530 asserts one of the decoder output lines 540 based on the binary count signal at its input 531. For example, if the counter counts 5 clock cycles between the start pulse $P_1$ and the stop pulse STOP, a binary 101 will be provided on the output count lines 520 which sets a fifth output line 545 of the decoder output lines 540 to a logic one. The other decoder output lines 540 will be maintained at a logic zero state.

The bits in the information packet signal $F_1$ are sequentially clocked through the stages of flip-flops 560 in the variable delay circuit 160 at successive clock cycles of the clock signal CLOCK. The binary data of the signal $FA_1$ appearing at the output of OR-gate 570 will be equivalent to the binary data of the $F_1$ signal at the particular delay stage that is connected to the asserted decoder output line. For example, if decoder output line 545 is asserted, the binary data generated by the OR-gate 570 will be the data at the fifth flip-flop 568 which corresponds to the information packet signal $F_1$ delayed by five clock cycles.

Thus, the delay control subcircuit 410 and the variable delay circuit 160 will generate an aligned information packet signal $FA_1$ based on the received information packet signal $F_1$ with a delay corresponding to the time interval between the start pulse $P_1$ and the stop pulse STOP. In this manner, each of the information packet signals $F_1$-$F_4$, shown in FIG. 2, may be delayed by a particular time interval to form the corresponding aligned information packet signals $FA_1$-$FA_4$.

Figure 6:
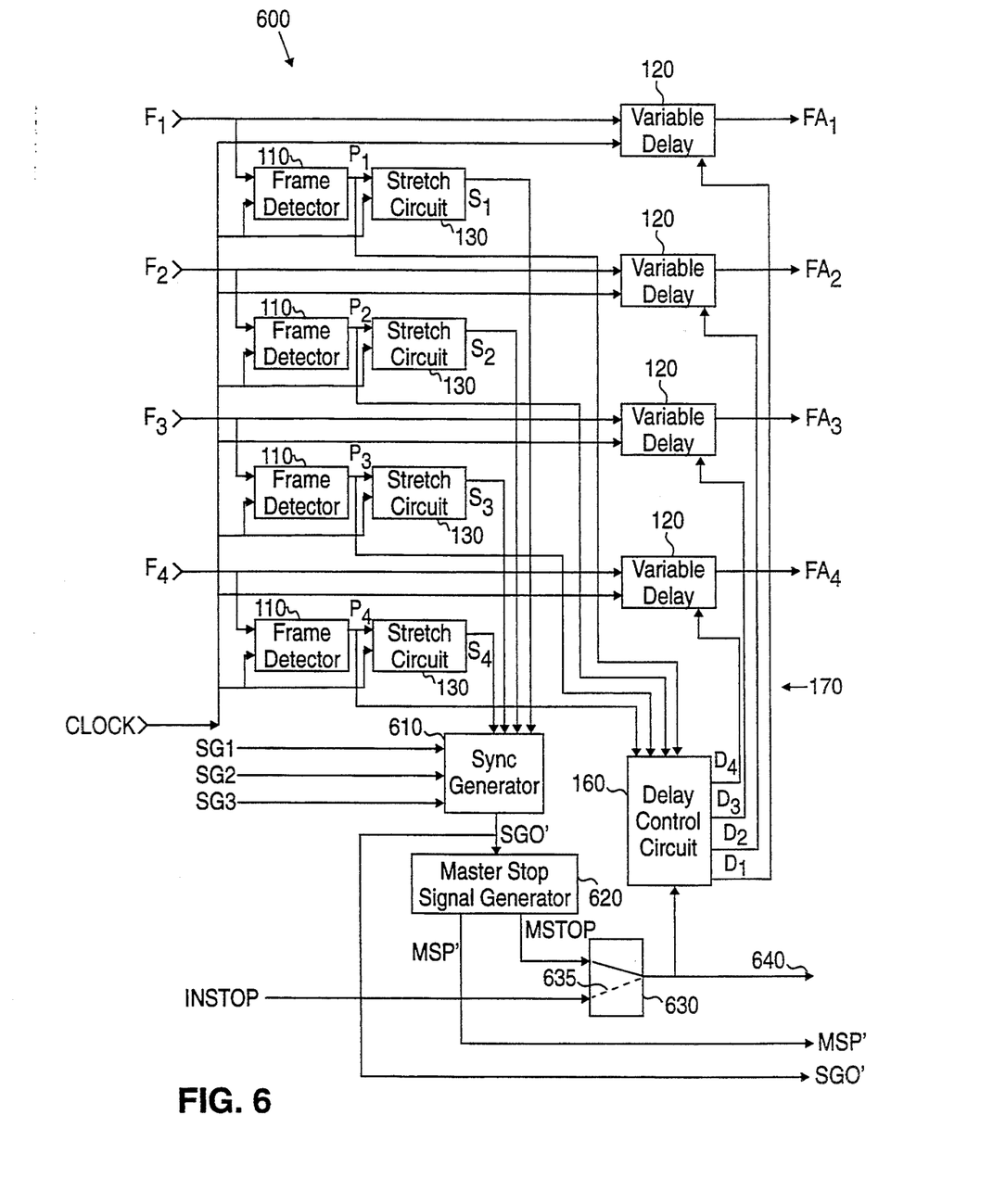
FIG. 6 is a schematic illustration of a modular frame aligner.

A modular frame aligner 600 similar to the frame aligner 10 in FIG. 2 but capable of modular operation is shown in FIG. 6. The components of the modular frame aligner 600 that are substantially similar to those in FIG. 2 are represented with the same corresponding reference numbers. For example, the frame detectors in FIGS. 2 and 6 are shown with the reference number 110.

Referring to FIG. 6, information packet signals $F_1$-$F_4$ are provided to corresponding frame detectors 110 and variable delay circuits 120. The frame detectors 110 generate start signals $P_1$-$P_4$ which are provided to corresponding stretch circuits 130 and to the delay control circuit 160. The stretch circuits 130 generate stretch signals $S_1$-$S_4$ and the variable delay control circuits 160 generate the aligned information packet signals $FA_1$-$FA_4$. The clock signal CLOCK is provided to the frame detectors 110, the stretch circuits 130 and the variable delay circuits 120. The components described above in FIG. 6 are substantially identical and operate in substantially the same manner as their counterparts in FIG. 2. The frame aligner 10 in FIG. 2 and the modular frame aligner 600 in FIG. 6 differ in the components that generate the stop pulse STOP.

Referring again to FIG. 6, the stretch signals $S_1$-$S_4$ generated by the corresponding stretch circuits 130 are provided to a modular synchronous signal generator 610. The signal generator 610 may also receive signals SG1, SG2 and SG3 which are generated by other frame aligners similar to the modular frame aligner 600 of FIG. 6. The signals SG1, SG2 and SG3 are described below with reference to FIGS. 7 and 8.

The pulse generator 610 generates the master synchronous generator pulse signal SG0' which is substantially identical to signal SG0 in FIG. 2. The signal SG0' is provided to a master stop signal generator 620 which generates two signals, a pulse MSP' and a master stop pulse MSTOP.

The pulse MSTOP is provided to a master/slave switch 630 which also receives an input stop pulse signal INSTOP. The switch 630 is also connected to the delay control circuit 160 and a frame aligner output 640. The master/slave switch 630 is selectively switchable between a master position, as shown in FIG. 6, or a slave position, as shown by a dashed line 635 in FIG. 6. In the master position, the switch 630 provides the pulse MSTOP to the delay control circuit 160 and to the output 640. In the slave position, the switch 630 provides the signal INSTOP to the delay control circuit 160 and to the output 640. The signals MSP' and SG0' are also provided as output signals of modular frame aligner 600.

The modular frame aligner 600 may operate in a master frame aligner mode with the switch 630 set in the master position, or a slave frame aligner mode with the switch 630 set in the slave position. The switch 630 may be electronically or mechanically switchable.

Figure 7:
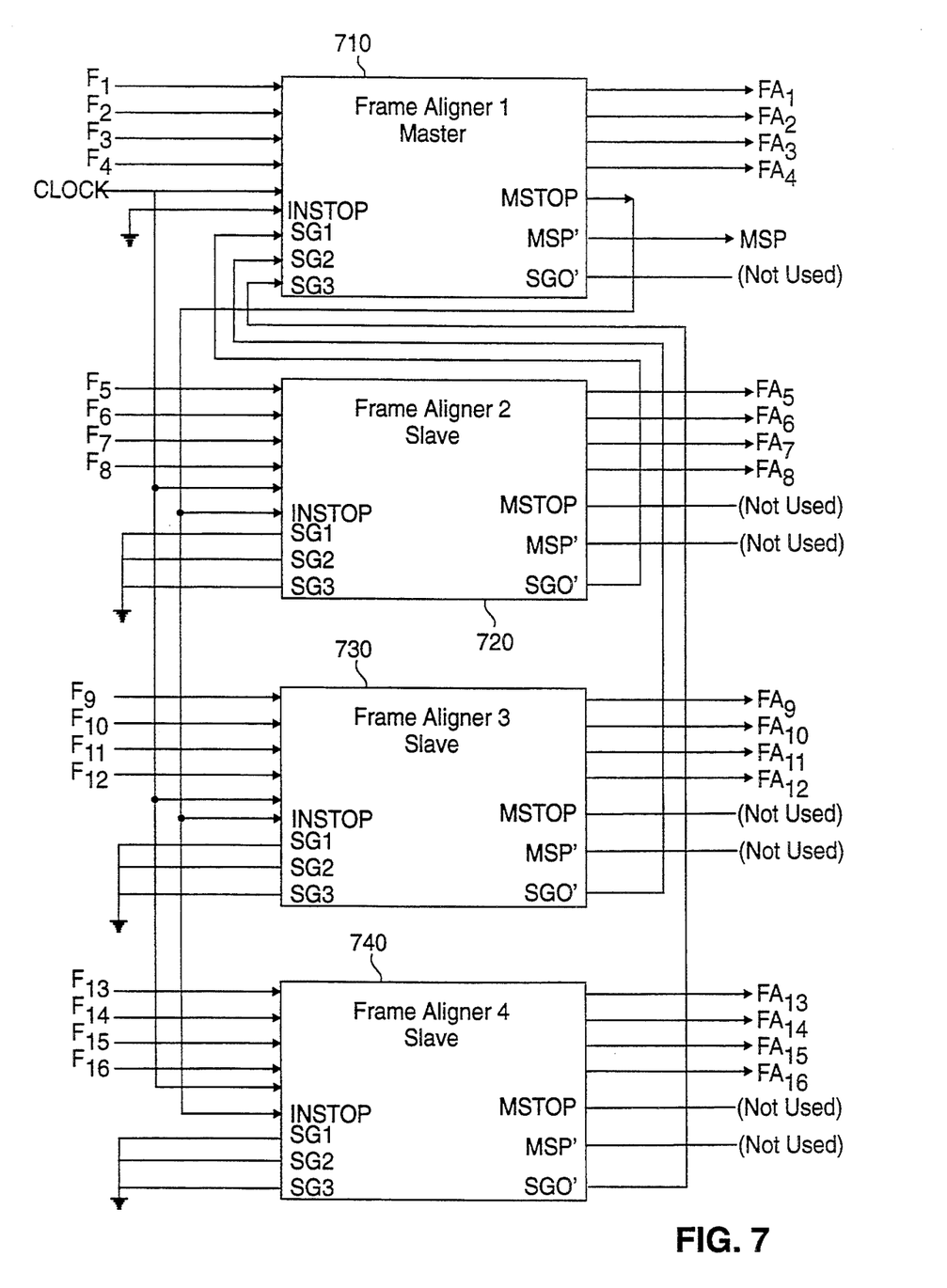
FIG. 7 is a schematic illustration of a modular frame aligner system employing the modular frame aligner of FIG. 6.

A frame aligner circuit 700 which uses four frame aligners 710-740, such as the modular frame aligner 600 of FIG. 6, for aligning 16 information packet signals $F_1$-$F_{16}$ into 16 aligned information packet signals $FA_1$-$FA_{16}$ is shown in FIG. 7. In FIG. 7, the master/slave switch of the frame aligner 710 is set in the master position while the master/slave switches of the frame aligners 720-740 are set in the slave position. The frame aligners 710, 720, 730 and 740 receive information packet signals $F_1$-$F_4$, $F_5$-$F_8$, $F_9$-$F_{12}$ and $F_{13}$-$F_{16}$, respectively, and generate signals $FA_1$-$FA_4$, $FA_5$-$FA_8$, $FA_9$-$FA_{12}$ and $FA_{13}$-$FA_{16}$, respectively.

The corresponding signals SG0' generated by the frame aligners 720-740 are connected to the SG1-SG3 inputs of the frame aligner 710. The pulse MSTOP present at the master stop output of frame aligner 710 is applied to the signal INSTOP input of the frame aligners 720-740. The INSTOP signal input of the frame aligner 710 is connected to ground. Also, the clock signal CLOCK is provided to each of the frame aligners 710-740.

In operation, each frame aligner 710-740 will generate its own start pulses which are applied to the respective delay control circuits. However, only the master frame aligner 710 will generate the master stop pulse MSTOP. The pulse MSTOP is applied to the delay control circuit 160 of the frame aligner 710 and to the INSTOP signal inputs of the frame aligners 720-740. The signal at the INSTOP inputs of the frame aligners 720-740 are then applied to the delay control circuits 160 through the master/slave switches 630. The generation of the master stop pulse MSTOP is based on the stretch signals $S_1$-$S_4$ of modular frame aligner 710 and the synchronization generator signals SG0' of the three modular frame aligners 720–740.

Figure 8:
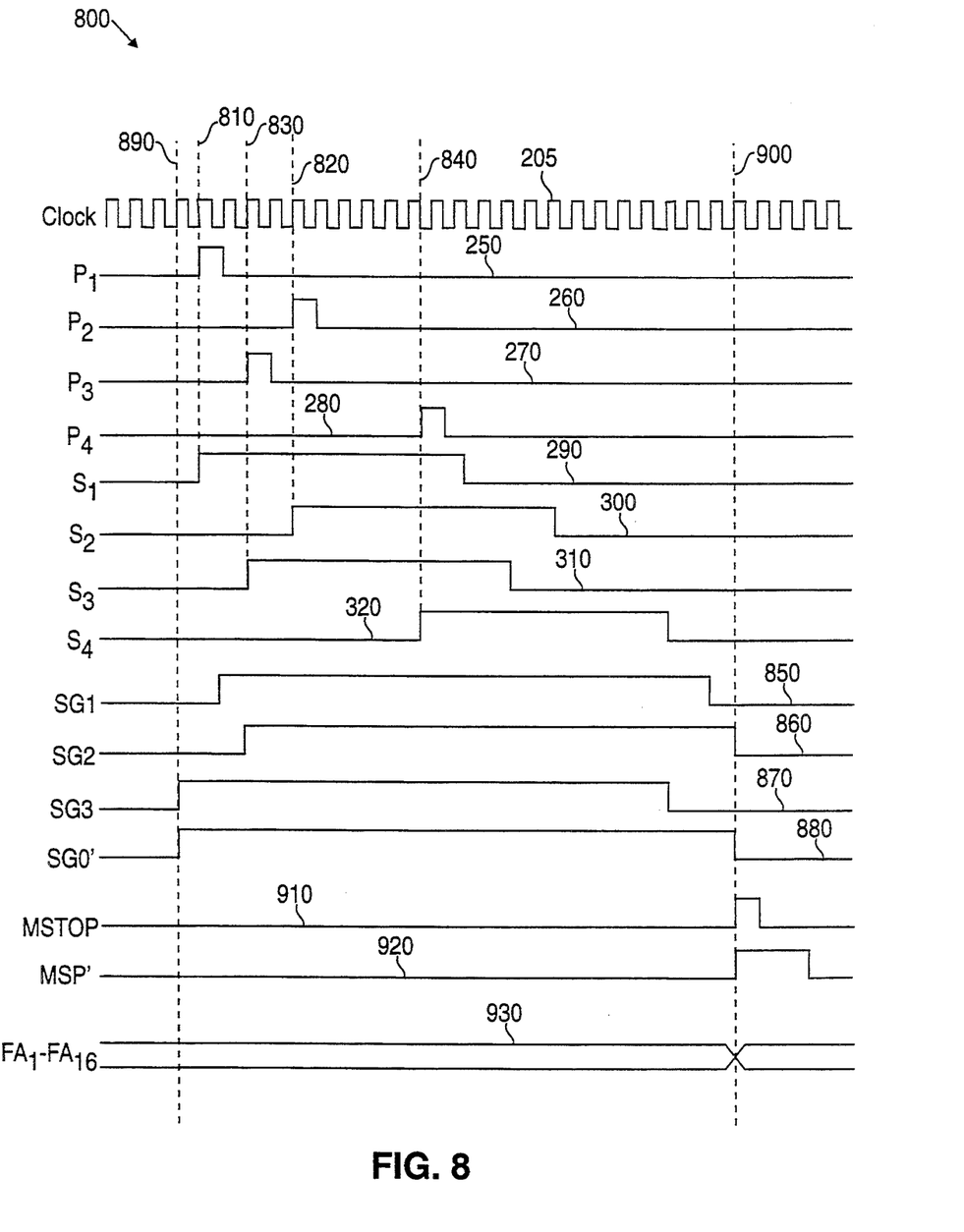
FIG. 8 is signal timing diagram corresponding to a master frame aligner of FIG. 7.

Details of the delays control operations and corresponding signals of the frame aligner 710 are shown in the timing diagram 800 of FIG. 8. The waveforms in timing diagram 800 that are substantially identical to those in the timing diagram 200 in FIG. 3 are identified by the reference numbers. For example, the waveforms depicting the clock signal CLOCK in FIGS. 3 and 8 are identified by the reference number 205.

Referring to FIG. 8, the start pulses $P_1$–$P_4$ generated by the frame detectors 110 of the modular frame aligner 710 occur at times 810–840, respectively. In response to receipt of the start pulses $P_1$–$P_4$, the stretch circuits 130 generate stretch signals $S_1$–$S_4$ which also start at times 810–840 as shown by waveforms 290–320. The modular frame aligners 710–740 whose operation is depicted in the timing diagram 800 of FIG. 8 have the same maximum starting time variation interval of 12 clock cycles. Correspondingly, the stretch signals $S_1$–$S_4$ 290–320 for the frame aligner 710 are 12 cycles in duration.

The signals at the inputs SG1–SG3 of the master frame aligner 710 are the corresponding signals SG0' generated by the frame aligners 720–740 and are represented by waveforms 850–870, respectively. The synchronization signal generator 610 generates the signal SG0' of the master modular frame aligner 710 by combining the stretch pulses $S_1$–$S_4$ 290–320, and the signals at the inputs SG1–SG3 850–870 by a logic OR operation as is represented by waveform 880.

The signal pulse SG0' 880 has a start time 890 corresponding to the start time of the earliest received or generated one of the signals $S_1$–$S_4$ and the signals at the inputs SG1–SG3. The earliest received signal 870 occurs on the SG3 input. The signal pulse SG0' 880 ends at the latest conclusion of the received or generated one of the signals $S_1$–$S_4$ and the signals at the inputs SG1–SG3. The conclusion of the last received signal, which is signal SG2 860, occurs at a time 900.

The master frame aligner 710 generates the master stop pulse MSTOP, shown as waveform 910, and the signal MSP', shown as a waveform 920, at the conclusion of the signal SG0' 880 at the time 900. The receipt of the master stop pulse MSTOP 910 by the delay control circuits 160 of the modular frame aligners 710–740 at the time 900 causes the generation of the aligned information packet signals $FA_1$–$FA_{16}$, shown by waveform 930. Thus, the modular frame aligner 600 of FIG. 6 can be arranged into an alignment circuit, such as alignment circuit 700, in FIG. 7, to align a large number of information packet signals with a minimal number of internal components, and input and output lines.

In an alternative embodiment, the frame alignment circuit 700 may be implemented with four slave frame aligners 600 utilizing an external processing unit or combinational logic circuit for generating the master stop pulse MSTOP.

The modular frame aligner of the present invention should not be limited to individually aligning four information packet signals or operating in groups of four to align 16 information packet signals, but may align a greater or lesser number of such signals or utilize a greater number of slave frame aligners. Further, the present invention should not be limited to operating on information packet signals and includes any digital information signals employing a start word, start bit or other start indicator.

I claim:

1. A frame aligner for aligning information packets received in a plurality of information packet signals, the information packets being received within a maximum starting time variation interval, the frame aligner comprising:
    a plurality of frame detector circuits, each frame detector circuit having a start signal output and an input for receiving a corresponding information packet signal;
    a plurality of stretch signal generators, each stretch signal generator having an output and an input, the input being connected to a corresponding frame detector start signal output, wherein each generator is operable to generate a stretch signal of a common particular duration at the output upon detection of a start signal;
    a synchronization signal generator having a plurality of inputs and an output, each input being connected to a corresponding stretch signal generator output;
    a delay control device having a plurality of start signal inputs, a synchronization signal input and a delay signal output, each start signal input being connected to a corresponding frame detector start signal output, the synchronization signal input being connected to the synchronization signal generator output; and
    a plurality of variable delay circuits, each variable delay circuit having an information packet signal input for receiving the information packet signals, a delay control input connected to the delay control device signal output and a delayed information packet signal output, wherein the synchronization signal generator generates a synchronization signal starting at a time of a first received stretch signal and ending at an end of a last received stretch signal and wherein the delay control device controls the variable delay device to delay each one of the corresponding information packet signals produced at the Variable delay circuits outputs based on the time interval defined by the start of the corresponding information packet signal and by the ending of the synchronization signal.

2. The frame aligner of claim 1, wherein the particular common duration of the stretch signals generated by the stretch signal generators is greater than or equal to the maximum starting time variation interval.

3. The frame aligner of claim 1, wherein the delay control device comprises:
    a plurality of counters, each counter having first and second inputs and an output, the first input being connected to a corresponding frame detector start signal output and the second input being connected to the synchronization signal generator output wherein the counter is operable to generate a delay control signal at its output by counting clock cycles of a clock signal during a time interval defined by a received start signal and an ending of a received synchronization signal.

4. The frame aligner of claim 3, wherein a rate of the clock signal is substantially identical to the data rate of one information packet signal of the plurality of information packet signals.

5. The frame aligner of claim 4, wherein the variable delay circuit comprises:
    a plurality of selectable delay stages, and wherein the variable delay circuit is operable to select one of the delay stages to cause a delay of a particular duration.

6. The frame aligner of claim 5, wherein the delay control device further comprises:
- a plurality of counters, each counter having first and second inputs and an output, the first input being connected to a corresponding frame detector start signal output and the second input being connected to the synchronization signal generator output wherein the counter is operable to generate a delay control signal at its output by counting clock cycles of a clock signal during a time interval defined by a received start signal and an ending of a received synchronization signal; and
- a plurality of decoders, each decoder connected to a corresponding counter output and to the plurality of delay stages in a corresponding variable delay circuit, wherein a particular delay control signal generated by the counter is decoded into selecting a corresponding delay stage of the variable delay circuit.

7. The frame aligner of claim 5, wherein the aligned information packet signal is generated at an output of an OR-gate having a plurality of inputs corresponding to the plurality of delay stages and wherein each delay stage comprises:
- a flip-flop having an input and an output; and
- an AND-gate having two inputs and an output, the input of the flip-flop is connected to the output of the flip-flop of the previous delay stage in the sequence, a corresponding information signal is applied to the input of the flip-flop for the first stage, the output of the flip-flop is connected to the first input of the AND-gate, the decoder is connected to the second input of the AND-gate, and the output of the AND-gate is connected to one input of the plurality of inputs of the OR-gate.

8. The frame aligner of claim 5, wherein the number of delay stages is capable of generating a maximum delay of at least twice the maximum starting time variation interval.

9. The frame aligner of claim 1, wherein the information packet signals are synchronous transfer mode level 1 frames.

10. The frame aligner of claim 1, wherein each of frame detector detects a start word immediately proceeding an information packet.

11. A frame aligner for aligning information packets received in a plurality of information packet signals, the information packets being received at various times within a maximum starting time variation interval, the frame aligner comprising:
- a plurality of frame detector circuits, each frame detector circuit receiving a corresponding information packet signal and being operable to generate a start signal upon detection of a start of the information packet;
- a plurality of stretch signal generators, each stretch signal generator receiving the start signal from a corresponding frame detector and generating a stretch signal;
- a synchronization signal generator receiving each of the stretch signals generated by the plurality of stretch signal generators, the synchronization signal generator being operable to generate a corresponding signal indicating the different starting times of the information packet signals;
- a master synchronization signal generator receiving the signal from the synchronization signal generator and being operable to generate a corresponding stop signal;
- a delay control circuit receiving the start signals generated by the plurality of frame detectors and the stop signal, and being operable to generate a corresponding plurality of delay signals; and
- a plurality of variable delay circuits being operable to generate a plurality of frame aligned information packet signals, each variable delay circuit receiving a corresponding one of the information packet signals and a corresponding one of the delay signals, and delaying the information packet signal for a particular time based on the delay signal to generate corresponding aligned information packet signal.

12. A method of aligning information packets received in a plurality of information packet signals comprising the steps of:
- detecting a start of each one of the information packets;
- generating a synchronization signal starting at a time of a first detected received information packet and ending at a predetermined interval after a start of a last detected received information packet;
- generating a plurality of delay signals corresponding to each one of the received information packets, each delay signal being based on a time interval between the detected start of the corresponding information packet and the end of the generated synchronization signal; and
- delaying each information packet signal for a particular time interval based on the corresponding delay signal of the plurality of delay signals to align the received information packets.

13. The method of claim 12, wherein the step of generating the synchronization signal comprises the steps of:
- generating a plurality of stretch signals of substantially identical duration, each stretch signal being generated upon detection of a corresponding information packet;
- starting the synchronization signal at a time of a first generated stretch signal: and
- ending the synchronization signal at an end of a last generated stretch signal.

14. A frame aligner system for aligning information packets received in a plurality of information packet signals, the information packets being received within a maximum starting time interval, the frame aligner system comprising:
- a master frame aligner module having a master stop signal output and at least one slave synchronization signal input, the master frame aligner module further having a plurality of information packet signal inputs and a corresponding plurality of information packet signal delay outputs, the plurality of information signal inputs receiving particular ones of the plurality of information packet signals; and
- at least one slave frame aligner module, the slave frame aligner module having a master stop signal input and a slave synchronization signal output connected to the master frame aligner module master stop signal output and to a corresponding slave synchronization input, respectively, each slave frame aligner module further having a plurality of information packet signal inputs and a corresponding plurality of information packet signal delay outputs, the plurality of information signal inputs receiving respective information packet signals of the plurality of information packet signals., wherein the slave frame aligner module generates a slave synchronization signal at the slave synchronization signal output indicating a time of a first received information packet signal and a particular time duration after a last received information packet signal, and wherein the master frame aligner module generates the master stop signal at the master stop signal output at the latest of the received slave synchronization signal and the particular time duration after a last received information packet signal by the master frame aligner module, and wherein the master and slave frame aligner modules delay each of the received information packet signals until the generation of the master stop signal.

15. The system of claim 14, wherein the master frame aligner module comprises:
- a plurality of frame detector circuits, each frame detector circuit having an input for receiving a corresponding information packet signal and a start signal output;
- a plurality of stretch signal generators, each stretch signal generator having an output and an input, the input being connected to a corresponding frame detector start signal output, wherein each generator is operable to generate a stretch signal of the particular duration at the output upon detection of a start signal;
- a synchronization signal generator having a plurality of stretch signal inputs, at least one slave synchronization signal input for receiving corresponding slave synchronization signals, and a master synchronization signal output, each stretch signal input being connected to a corresponding stretch signal generator output;
- a master stop signal generator having a master synchronization signal input connected to the synchronization signal generator output and a master stop signal output, the master stop signal generator being operable to generate the master stop signal at the output;
- a delay control device having a plurality of start signal inputs, a stop signal input and a plurality of delay signal outputs, each start signal input being connected to a corresponding frame detector start signal output, the stop signal input being connected to the master stop signal generator output; and
- a plurality of variable delay circuits, each variable delay circuit having an information packet signal input for receipt of the information packet signals, a delay control input connected to a corresponding one of the delay control circuit delay signal outputs and a delayed information packet signal output, wherein the synchronization signal generator provides a master synchronization signal to the master stop signal generator starting at a time of the first received stretch signal and ending at the latest of the end of a last received stretch signal and the slave synchronization signal generated by the slave frame aligner module.

16. The system of claim 14, wherein the slave frame aligner module comprises:
- a plurality of frame detector circuits, each frame detector circuit having an input for receiving a corresponding information packet signal and a start signal output;
- a plurality of stretch signal generators, each stretch signal generator having an output and an input, the input being connected to a corresponding frame detector start signal output, wherein each generator is operable to generate a stretch signal of the particular duration at the output upon detection of a start signal;
- a synchronization signal generator having a plurality of inputs and a master synchronization signal output, each input being connected to a corresponding stretch signal generator output;
- a slave delay control device having a delay control output, a master stop signal input for receiving the master stop signal generated by the master frame aligner and a plurality of start signal inputs, each start signal input being connected to a corresponding frame detector start signal output; and
- a plurality of variable delay circuits, each variable delay circuit having an information packet signal input for receipt of the information packet signals, a delay control input connected to the delay control circuit output and a delayed information packet signal output, wherein the slave delay control device controls each of the variable delay circuits to delay corresponding information packet signals by a time interval defined by a start of the corresponding information packet signal and by a master stop signal generated by the master module frame aligner.

17. A frame aligner module for selectively operating as a master or slave frame aligner module to align received information signals comprising:
- a plurality of frame detector circuits, each frame detector circuit having a start signal output and receiving a corresponding information packet signal;
- a plurality of stretch signal generators, each stretch signal generator having an output and an input, the input being connected to a corresponding frame detector start signal output, wherein each generator is operable to generate a stretch signal of a common particular duration at the output upon detection of a start signal;
- a synchronization signal generator having a plurality of inputs and an output, each input being connected to a corresponding stretch signal generator output;
- a delay control device selectively switchable between a master and a slave mode, the delay control device having a plurality of start signal inputs, a synchronization Signal input, and a delay signal output, each start signal input being connected to a corresponding frame detector start signal output, the synchronization signal input being connected to the synchronization signal generator output, wherein when in a slave mode, the delay control device is operable to receive a master stop signal at an input and generate a slave synchronization signal at an output, and wherein when in a master mode, the module delay control device is operable to receive at least one slave synchronization signal and generate a master stop signal at an output; and
- a plurality of variable delay circuits, each variable delay circuit having an information packet signal input for receipt of the information packet signals, a delay control input connected to the delay control circuit signal output and a delayed information packet signal output, wherein the delay control device controls each of the variable delay circuits to delay a corresponding information packet by a time interval defined by the start of the corresponding information packet and a master stop signal, and wherein when in a slave mode, the master stop signal is received from a master frame aligner, and when in a master mode, the master stop signal is generated by the defined by a start of the corresponding information packet and a latest of the end of the synchronization signal and received slave synchronization signals generated by associated slave frame aligner modules.

* * * * *